United States Patent
Hermle et al.

(10) Patent No.: US 11,803,558 B2
(45) Date of Patent: Oct. 31, 2023

(54) RELEVANCE-INDEPENDENT POSITION EFFECTS ESTIMATOR FOR DIGITAL ITEM RANKING

(71) Applicant: Microsoft Technology Licensing, LLC, Redmond, WA (US)

(72) Inventors: Johannes Hermle, San Francisco, CA (US); Giorgio P. Martini, Stanford, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 43 days.

(21) Appl. No.: 17/551,977

(22) Filed: Dec. 15, 2021

(65) Prior Publication Data

US 2023/0185812 A1    Jun. 15, 2023

(51) Int. Cl.
*G06F 16/248* (2019.01)
*G06F 16/2457* (2019.01)

(52) U.S. Cl.
CPC ...... *G06F 16/24578* (2019.01); *G06F 16/248* (2019.01)

(58) Field of Classification Search
CPC ............ G06F 16/24578; G06F 16/248; G06F 16/3438
See application file for complete search history.

(56) References Cited

U.S. PATENT DOCUMENTS

| | | | | |
|---|---|---|---|---|
| 10,296,642 B1* | 5/2019 | Chandran | ............. | G06Q 50/01 |
| 2008/0201348 A1* | 8/2008 | Edmonds | ............. | G06Q 30/02 |
| 2009/0171942 A1* | 7/2009 | Suresh | .................. | G06F 16/35 |
| | | | | 707/999.005 |
| 2011/0004509 A1* | 1/2011 | Wu | .................... | G06Q 30/0631 |
| | | | | 705/26.7 |
| 2013/0204859 A1* | 8/2013 | Vijaywargi | ......... | G06F 16/9535 |
| | | | | 707/E17.108 |
| 2014/0280554 A1* | 9/2014 | Webb | ................... | H04L 67/306 |
| | | | | 709/204 |
| 2018/0174190 A1* | 6/2018 | Ferreira | ................ | G06Q 50/01 |
| 2019/0179957 A1* | 6/2019 | Andrews | ............... | G06F 40/205 |

* cited by examiner

*Primary Examiner* — Robert W Beausoliel, Jr.
*Assistant Examiner* — Pedro J Santos
(74) *Attorney, Agent, or Firm* — NICHOLSON DE VOS WEBSTER & ELLIOTT LLP

(57) ABSTRACT

Technologies for generating relevance-independent position effects estimates for a set of ranked digital items are described. Embodiments include creating an input data set that includes request tracking data and associated activity tracking data. A relevance-independent position effects estimator generates an output data set. An item of the output data set includes user interface position data associated with a pair of adjacently positioned items of the input data set. The user interface position data indicates that a change in user interface activity probability data relating to a change in position between the items of the pair is greater than a change in the user interface activity probability data relating to a difference in the relevance score between the items of the pair. The output data set is stored in a searchable data store. Data from the searchable data store is provided to a downstream service.

20 Claims, 8 Drawing Sheets

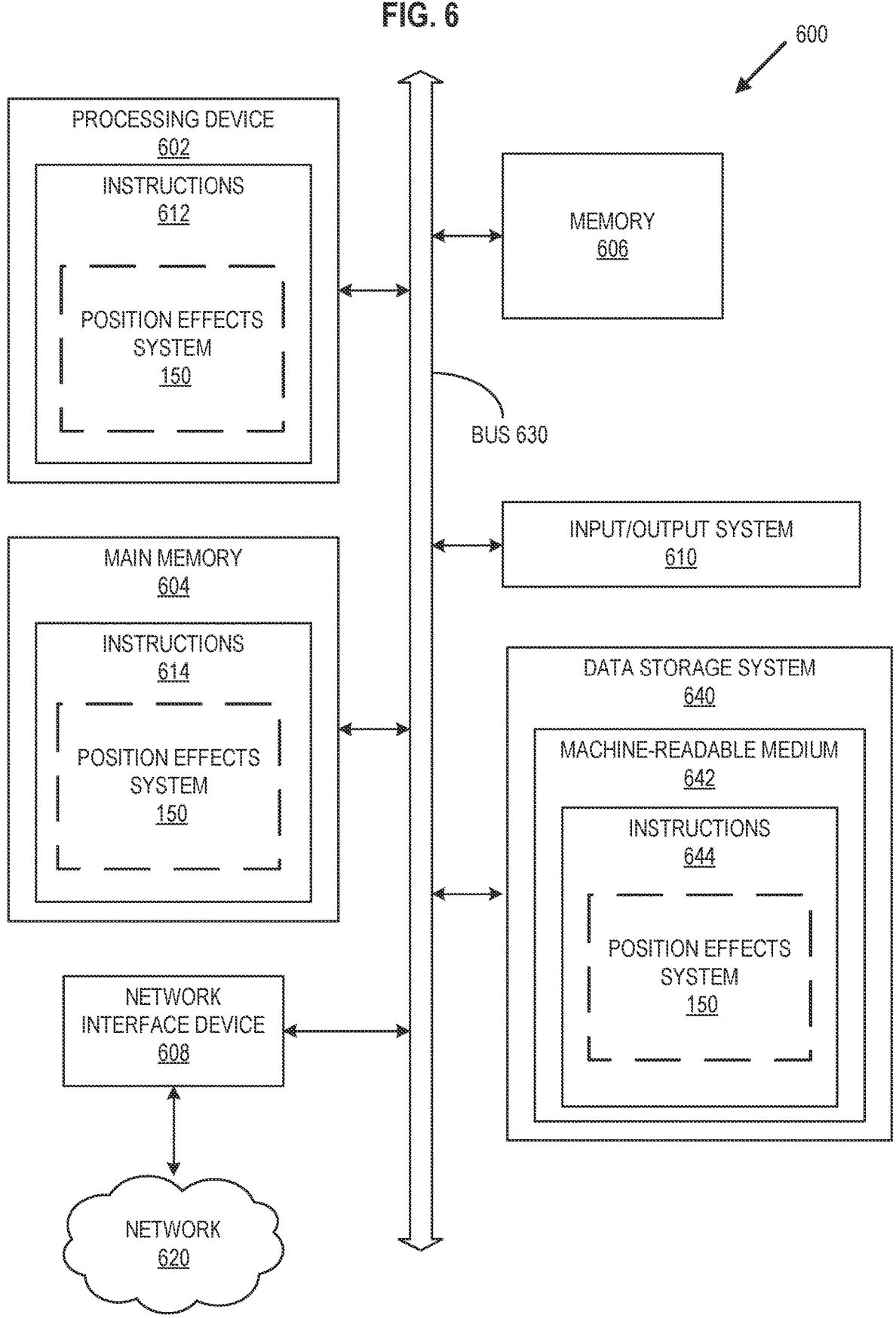

RELEVANCE-INDEPENDENT POSITION EFFECTS ESTIMATOR FOR DIGITAL ITEM RANKING

TECHNICAL FIELD

A technical field to which the present disclosure relates is the ranking of digital items in an online system. Another technical field to which this disclosure relates is the training of ranking models. Yet another technical field to which this disclosure relates is incrementality simulation.

BACKGROUND

To present digital content items to a user, online systems execute a query, rank the search results returned by the query, and assign the search results to positions based on the ranking. The online system presents the content items in the user interface according to the positions to which the content items are assigned. Thus, position assignments determine arrangement of the content items on the user interface or the order in which digital content items are displayed in the user interface.

BRIEF DESCRIPTION OF THE DRAWINGS

FIG. 6 is a block diagram of an example computer system in which embodiments of the present disclosure can operate.

DETAILED DESCRIPTION

Figure 1A:
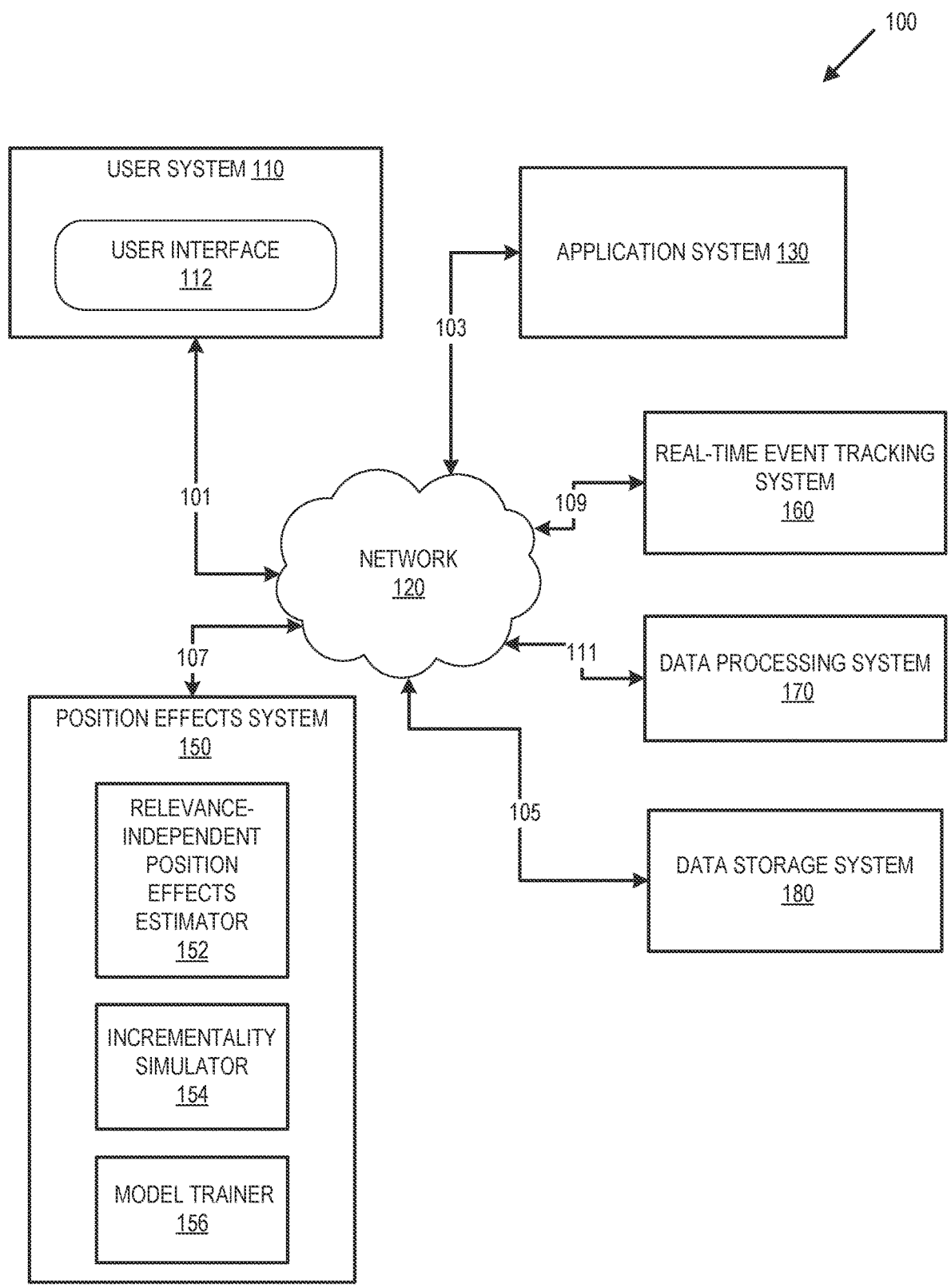
FIG. 1A illustrates an example computing system that includes a position effects system in accordance with some embodiments of the present disclosure.

Online systems often display digital content items in a rank order according to a ranking score, where the content item with the highest ranking score is displayed at the top of a list and content items with lower ranking scores are displayed further down on the list. The position of a digital content item on a user interface relative to other digital content items often corresponds to the ranking score of the digital content item. For example, a digital content item that has the highest ranking score of all digital content items in a given result set is assigned to a first position on the user interface while digital content items with lower ranking scores are assigned to lower positions; e.g., the third, fifth, or tenth position, for presentation on the user interface.

Position effect, also known as position bias, refers to the click advantage, i.e., the increase in click probability, that a digital content item receives when it is moved from a lower position to a higher position on the user interface. For instance, the position effect of moving an item from a position 3 to a position 2 within the user interface corresponds to a change in the click probability the item receives from having moved positions (e.g., an increase in the click probability the item receives at position 2 relative to the click probability the item receives at position 3).

Click as used herein includes any type of user interface interaction with a digital content item presented at a particular position. For example, clicks can include passive or active user interface interactions such as mouse clicks, touchscreen taps, scrolling, elapses of time without any interactions, and/or other inputs that are translated by the online system as views, likes, comments, shares, retweets, etc. related to a particular digital content item of a set of ranked digital content items.

Online systems often use machine learning models, such as ranking models, to generate ranking scores for digital content items. Measures of ranking model performance include click probability accuracy and calibration. Click probability, or more generally, user interface activity probability, is a probabilistic measure of the likelihood that a user will click on a digital content item presented at a particular position on the user interface. Click probability accuracy is a measure of the accuracy of the click probability value; i.e., how accurate is it that if a digital content item x is assigned to a position y, the click probability will be z? Calibration is a measure of the average click probability accuracy (e.g., is the click probability correct on average, over a set of observations).

Position effect can be an important input that helps the online system determine how well its ranking model is performing in a particular computing environment or across different computing environments. The online system can use position effects data to improve the click probability certainty of its ranking model. Additionally, while it is often challenging to explain how machine learning models generate output, position effects data can be used to communicate an evaluation of the performance of the ranking model to engineers, software developers, users, administrators, and others. For example, historical position effects data can be used to forecast click probabilities for different scenarios in which one or more parameters of the computing environment are varied.

Examples of computing environment parameters include priority, impression portal, and impression channel. Priority corresponds to a value assigned to a particular digital content item or category of digital content items. For example, different providers of digital content items may assign different priority values to different digital content items or categories of digital content items that they provide. As another example, an individual digital content provider may have different priority values associated with different digital content items or categories of digital content items that it provides. For instance, "breaking news" content items could have a high priority across all digital content providers while "job opening" content items might have a high priority only for users who have engaged in job seeking activities within the online system. Similarly, content items that are "shared" by a user might have a high priority for other users that are first-degree connections in the user's network but a lower priority for second-degree and higher connections of the sharing user.

Irrespective of how priority is defined, how well a content item's priority correlates with its click probability can be an important indicator of ranking model performance. For example, high priority items are expected to have a high click probability, low priority items are expected to have a low click probability, and so on. The accuracy of these correlations are impacted by position effects. Thus, accurate position effects estimates are important for accurate evaluations of a ranking model's performance.

Position effects estimates can vary by impression portal and/or impression channel. As used herein, impression portal refers to the type of computing device used by a user to view a set of ranked digital content items. Position effects estimates can vary considerably based on whether the digital content item is viewed on, for example, a desktop or laptop computer, tablet computer, or smart phone.

Impression channel as used herein refers to a software-based mechanism or user interface functionality through which a digital content item is made viewable or perceivable to a user as a result of the execution of a search query. Examples of impression channels include people search, job search, home page (or home screen), news feed, notifications page (or screen), and recommendation pages (or screens), including jobs you may be interested in, other products you may be interested in, people you may be interested in, etc. An impression channel can present sets of ranked digital content items in a vertically scrollable list format or any other suitable format. For example, in some applications, digital content item positions may be distributed horizontally across the user interface screen or both horizontally and vertically. Thus, while first position as used herein often refers to the top of a vertical list, first position can refer to any position on the user interface.

Other examples of computing environment parameters include browser window size, screen resolution, operating system type, and device model. Still other examples of computing environment parameters include user profile data such as job seekers vs. non-job seeking users.

Position effects are hard to estimate accurately. This can be due to the challenges already mentioned above: a search result with a high ranking score is considered to be highly relevant to the query used to retrieve it and thus ranked higher which induces a correlation of position and relevance. Since more relevant search results are ranked higher than less relevant results, simply comparing the average number of clicks of higher and lower-ranked results, as other approaches do, conflates position effects with relevance. Conflating position effects with relevance negatively affects the accuracy of the position effects estimates, for example leading to an upward bias in the position effects estimates. Alternatively or in addition, the fact that the relationship between position and click probability is nonlinear makes it challenging to generate accurate position effects estimates. Other approaches deliver random variation in positions but these approaches have proven costly to implement.

Aspects of the present disclosure address the above technical challenges and/or other deficiencies of other approaches to estimating position effects. As described in more detail below, embodiments provide a relevance-independent position effects estimator that generates position effects estimates based on real-time request tracking data and real-time activity tracking data. Real-time request tracking data captures data pertaining to requests (e.g., page loads) at user devices. Real-time activity tracking data captures user interface events (e.g., clicks) associated with requests.

Aspects of this disclosure achieve relevance-independent position effects estimates by using a regression discontinuity design (RDD)-based statistical estimation technique. As applied to the particular problem of de-biasing position effects in ranking scores, the RDD approach is implemented as logic that identifies very small changes in adjacent ranking scores, which can lead to a discontinuous change in the on-screen position of the search result. The relevance-independent position effects estimates produced by embodiments of the disclosed approach are used for incrementality simulation and for training or retraining ranking models, among other applications.

The disclosed technologies can be described with reference to an example use case of ranking a set of digital content items retrieved in response to a search query, i.e., search results. However, aspects of the disclosed technologies are not limited to ranking models used to rank search results, but can be used to improve other types of ranking models, more generally.

Additionally, aspects of the disclosed technologies can be used to generate simulations of user responses to the positioning of digital content items on a user interface screen by an online system, but have broader applicability as well. For example, aspects of the disclosed technologies also can be used to simulate position effects related to, for example, changes in the positioning of icons and/or user interface controls (such as menu bar items, buttons, input boxes, etc.) on a user interface screen.

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 1A illustrates an example computing system 100 that includes a position effects system 150. In the embodiment of FIG. 1A, computing system 100 includes a user system 110, a network 120, an application system 130, position effects system 150, real-time event tracking system 160, data processing system 170, and data storage system 180.

User system 110 includes at least one computing device, such as a personal computing device, a server, a mobile computing device, or a smart appliance. User system 110 includes at least one software application, including a user interface 112, installed on or accessible by a network to a computing device. For example, user interface 112 is or includes a front-end portion of application system 130, which may be implemented as a native application on a computing device or as a web application that launches in a web browser.

User interface 112 is any type of user interface as described above. User interface 112 can be manipulated by a user to input, upload, or share data, data records, and digital content items and/or to view or otherwise perceive data, data records, and digital content items distributed by application system 130. For example, user interface 112 can include a graphical user interface, haptic interface, and/or a conversational voice/speech interface that includes one or more mechanisms for viewing and manipulating digital content items.

Application system 130 is any type of application software system that includes or utilizes functionality provided by position effects system 150. Examples of application system 130 include but are not limited to connections network software, such as professional and/or general social media platforms, and systems that are or are not be based on connections network software, such as digital content distribution services, general-purpose search engines, job search software, recruiter search software, sales assistance software, advertising software, learning and education software, messaging software, e-commerce software, or any combination of any of the foregoing. An example embodiment of application system 130 is shown in FIG. 1B, described below.

The position effects system 150 of FIG. 1A includes a relevance-independent position effects estimator 152, an incrementality simulator 154, and a model trainer 156. In other implementations, position effects system 150 includes one or the other of incrementality simulator 154 and model trainer 156 but not both. Position effects estimator 152 generates relevance-independent position effects estimates for ranked sets of digital content items. Incrementality simulator 154 runs simulations of online environments and generates forecasted correlations of position and click probability for different combinations of computing environment parameters. Model trainer 156 trains or retrains ranking models using position effects estimates produced by position effects estimator 152. Additional description of the various components of position effects system 150 is provided below.

Figure 1B:
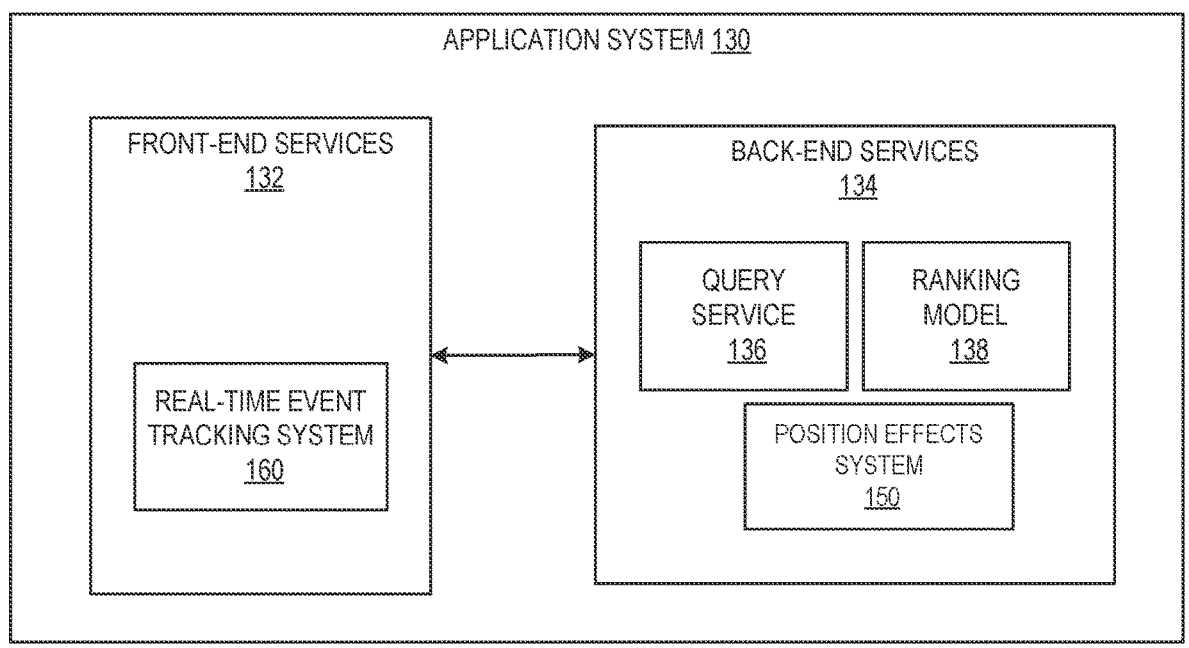
FIG. 1B is an example of an application system that includes a position effects system in accordance with some embodiments of the present disclosure.

In some implementations, application system 130 includes at least a portion of position effects system 150, as shown in FIG. 1B, described below. As shown in FIG. 6, described below, embodiments of position effects system 150 are implemented as instructions stored in a memory, and a processing device 602 is configured to execute the instructions stored in the memory to perform the operations described herein.

Real-time event tracking system 160 captures user interface events such as page loads and clicks in real time, and formulates the user interface events into a data stream that can be consumed by, for example, a stream processing system. For example, when a user of application system 130 clicks on a user interface control such as view, comment, share, like, or loads a web page, etc., real-time event tracking system 160 fires an event to capture the user's identifier, the event type, the date/timestamp at which the user activity occurred, and possibly other information about the user interface event, such as the impression portal and/or the impression channel involved in the user interface event. Real-time event tracking system 160 generates a data stream that includes one record of real-time event data for each user interface event that has occurred. Real-time event tracking system 160 is implemented using APACHE KAFKA in some embodiments.

"Time" as used in the context of terminology such as real-time, near real-time, and offline, can refer to the time delay introduced by the use of computer technology, e.g., by automated data processing and/or network transmission, where the time delay is the difference in time as measured by a system clock, between the occurrence of an online event and the use of data processed in response to the event, such as for display, feedback, and/or control purposes.

Data processing system 170 includes mechanisms for real-time data processing, near real-time processing, and batch processing, in some embodiments. Real-time data processing involves a continual input, such as a live feed, immediate, constant processing of the data stream, and steady output in response to the continual input. Real-time data processing involves low-latency messaging and event processing. An example of real-time data processing is data streaming, where the streaming data is not persisted for further analysis. In real-time data processing, the acceptable processing time is seconds, sub-seconds or less (e.g., milliseconds). An example of a tool that can be used for real-time data processing is APACHE SAMZA.

In contrast to real-time processing, near real-time data processing persists the incoming data and then processes the data. An example of a use of near real-time data processing is to combine data from multiple different data sources, for example to detect patterns or anomalies in the data. Examples of near real-time processing include processing sensor data, network monitoring, and online transaction processing. In near real-time data processing, the acceptable processing time is in the range of minutes or seconds. An example of a tool that can be used for near real-time, asynchronous data processing is APACHE SAMZA.

Offline or batch data processing is less time-sensitive than near real-time or real-time processing. In batch data processing, the acceptable processing time is in the range of days or hours. An example of a tool that can be used for batch data processing is APACHE HADOOP.

Data storage system 180 includes data stores and/or data services that store digital content items, data received, used, manipulated, and produced by application system 130, and data received, used, manipulated, and produced by position effects system 150. In some embodiments, data storage system 180 includes multiple different types of data storage and/or a distributed data service. As used herein, data service may refer to a physical, geographic grouping of machines, a logical grouping of machines, or a single machine. For example, a data service may be a data center, a cluster, a group of clusters, or a machine.

Data stores of data storage system 180 can be configured to store data produced by real-time, near real-time (also referred to as nearline), and/or offline (e.g., batch) data processing. A data store configured for real-time data processing can be referred to as a real-time data store. A data store configured for near real-time data processing can be referred to as a near real-time data store or nearline data store. A data store configured for offline or batch data processing can be referred to as an offline data store. Data stores can be implemented using databases, such as key-value stores, relational databases, and/or graph databases. Data can be written to and read from data stores using query technologies, e.g., SQL or NoSQL.

A key-value database, or key-value store, is a nonrelational database that organizes and stores data records as key-value pairs. The key uniquely identifies the data record, i.e., the value associated with the key. The value associated with a given key can be, e.g., a single data value, a list of data values, or another key-value pair. For example, the value associated with a key can be either the data being identified by the key or a pointer to that data. A relational database defines a data structure as a table or group of tables in which data are stored in rows and columns, where each column of the table corresponds to a data field. Relational databases use keys to create relationships between data stored in different tables, and the keys can be used to join data stored in different tables. Graph databases organize data using a graph data structure that includes a number of interconnected graph primitives. Examples of graph primitives include nodes, edges, and predicates, where a node stores data, an edge creates a relationship between two nodes, and a predicate is assigned to an edge. The predicate defines or describes the type of relationship that exists between the nodes connected by the edge.

Data storage system 180 resides on at least one persistent and/or volatile storage device that can reside within the same local network as at least one other device of computing system 100 and/or in a network that is remote relative to at least one other device of computing system 100. Thus, although depicted as being included in computing system 100, portions of data storage system 180 can be part of computing system 100 or accessed by computing system 100 over a network, such as network 120.

Any of user system 110, application system 130, position effects system 150, real-time event tracking system 160, data processing system 170, and/or data storage system 180 includes an interface embodied as computer programming code stored in computer memory that when executed causes a computing device to enable bidirectional communication with any other of user system 110, application system 130, position effects system 150, real-time event tracking system 160, data processing system 170, and/or data storage system 180 using communicative coupling mechanisms 101, 103, 105, 107, 109, 111. Examples of communicative coupling mechanisms include network interfaces, inter-process communication (IPC) interfaces and application program interfaces (APIs).

In some embodiments, a client portion of application system 130 operates in user system 110, for example as a plugin or widget in a graphical user interface of a software application or as a web browser executing user interface 112. In an embodiment, a web browser transmits an HTTP request over a network (e.g., the Internet) in response to user input that is received through a user interface provided by the web application and displayed through the web browser. A server running application system 130 and/or a server portion of application system 130 receives the input, performs at least one operation using the input, and returns output using an HTTP response that the web browser receives and processes.

Other technologies that can be used to effectuate communications of data and instructions between any of user system 110, application system 130, position effects system 150, real-time event tracking system 160, data processing system 170, and/or data storage system 180 include application programming interfaces (APIs) such as REST (representational state transfer) APIs and SOAP (simple object access protocol), scripting languages such as JavaScript, markup languages such as XML (extensible markup language) and JSON (JavaScript object notation), and AJAX (asynchronous JavaScript and XML).

Each of user system 110, application system 130, position effects system 150, real-time event tracking system 160, data processing system 170, and/or data storage system 180 is implemented using at least one computing device that is communicatively coupled to electronic communications network 120 using communicative coupling mechanisms 101, 103, 105, 107, 109, 111. Any of user system 110, application system 130, position effects system 150, real-time event tracking system 160, data processing system 170, and/or data storage system 180 are bidirectionally communicatively coupled by network 120. User system 110 as well as one or more different user systems (not shown) are bidirectionally communicatively coupled to application system 130 while application system 130 is accessed by a user of user system 110.

A typical user of user system 110 is an administrator or an end user of application system 130 and/or position effects system 150. An administrator or an end user can be a human person or a computer program designed to simulate human use of application system 130, such as a bot. User system 110 is configured to communicate bidirectionally with any of user system 110, application system 130, position effects system 150, real-time event tracking system 160, data processing system 170, and/or data storage system 180 over network 120 using communicative coupling mechanism 101. User system 110 has at least one address that identifies user system 110 to network 120 and/or application system 130; for example, an IP (internet protocol) address, a device identifier, a MAC (media access control) address, a session identifier, a user account identifier, or any combination of any of the foregoing.

The features and functionality of user system 110, application system 130, position effects system 150, real-time event tracking system 160, data processing system 170, and/or data storage system 180 are implemented using computer software, hardware, or software and hardware, and can include combinations of automated functionality, data structures, and digital data, which are represented schematically in the figures. User system 110, application system 130, position effects system 150, real-time event tracking system 160, data processing system 170, and/or data storage system 180 are shown as separate elements in FIG. 1A for ease of discussion but the illustration is not meant to imply that separation of these elements is required. The illustrated systems, services, and data stores (or their functionality) can be divided over any number of physical systems, including a single physical computer system, and can communicate with each other in any appropriate manner.

Network 120 is implemented on any medium or mechanism that provides for the exchange of data, signals, and/or instructions between the various components of computing system 100. For example, data and instructions can be represented as signals, where a signal includes a series of bits, and a bit value corresponds to a designated level of electrical charge that can traverse network 120 and be received and processed by devices on network 120. Examples of network 120 include, without limitation, a Local Area Network (LAN), a Wide Area Network (WAN), an Ethernet network, the Internet, at least one terrestrial, satellite or wireless link, or a combination of any number of different networks and/or communication links.

FIG. 1B is an example of an application system that includes at least a portion of position effects system 150 in accordance with some embodiments of the present disclosure.

In FIG. 1B, application system 130 includes front end services 132 and back-end services 134. Application system 130 includes many more components than are shown in FIG. 1B, such as databases and network services, but those details are omitted from FIG. 1B for ease of discussion. For example, in some embodiments, application system 130 includes data stores that store entity data, activity data, content item data, and a social graph. Entity data, activity data, content item data, and social graph are included in an embodiment in which application system 130 is a social network application. Other embodiments of application system do not include one or more of entity data, activity data, content item data, and social graph.

Front-end services 132 enable data manipulations and communications between users of application system 130, which can be represented as entities in application system 130. For example, front-end services 132 present sets of ranked digital content items to end users and receive inputs generated by end users through bidirectional communication with user interfaces 112 of user systems 110.

In application systems that represent users as entities, an entity in application system 130 is a logical construct that is linked with an address of a physical user system 110. A user system 110 can be associated with more than one entity in application system 130. For example, a physical user system 110 can be associated with multiple different logical account identifiers, and a logical account identifier in application system 130 can be associated with multiple different physical user systems 110 (e.g., the same logical account identifier can be used to access application system 130 on a smartphone, a smartwatch, and a laptop). In a professional social media implementation of application system 130, examples of entity types include users, companies, organizations, jobs, and content items. Data manipulations and communications performed by a user system 110 in application system 130 can be described with reference to an entity associated with the user system 110.

Front-end services 132 include functionality that is exposed to users of application system 130 through a user interface, such as user interface 112. Front-end services 132 include, for example, user interface features and functions that enable users to scroll a feed of digital content items, enter and execute search queries, follow other entities, view, like, create, upload, share, forward, reply to, and save data, data records, and digital content items, including system-generated recommendations, in application system 130, to view, like, add, edit, and delete comments and replies to comments on digital content items, and to view, send and receive messages with other users of application system 130. Embodiments of front-end services 132 also include user interface features and functions that enable users to view, like, share, and otherwise manipulate data, data records, and digital content items presented in a search result, a feed, a recommendation, a notification, or a message generated by application system 130. Front-end services 132 also include real-time event tracking system 160, described above.

In the illustrated embodiment of application system 130, front-end services 132 and back-end services 134 are enabled by Internet communications technologies. For example, front-end services 132 that enable viewing of a digital content item in application system 130 includes the sending and receiving of network messages between the user system viewing a ranked set of digital content items and application system 130. Front-end services 132 that enable searching for, viewing and manipulation of data, a data record, search results, or a digital content item in application system 130 includes the sending and receiving of network messages between the user system viewing and/or manipulating the data, data record, or digital content item and application system 130. In some contexts, network messages are referred to as requests. Also, front-end services 132 and back-end services 134 can be asynchronous.

Real-time event tracking system 160 tracks user interface activity that corresponds to user interactions with application system 130. For example, when application system 130 loads a web page into the user interface (also referred to as a request), real-time event tracking system 160 fires an event to capture data associated with that page load, such as one or more of: request identifier, request timestamp, user identifier, device identifier, session identifier, impression portal, impression channel, request identifier, content item identifier, ranking score, and position. As another example, when a user clicks on a portion of the user interface that displays a digital content item of a set of ranked digital content items, real-time event tracking system 160 fires an event to capture data associated with that click event, such as one or more of: user identifier, click timestamp, device identifier, session identifier, impression portal, impression channel, request identifier, content item identifier, ranking score, and position. Real-time event tracking system 160 stores the captured tracking data in, for example, a searchable log file.

Back-end services 134 include computer operations, such as data manipulations and communications, which support the front-end services 132. For example, embodiments of back-end services 134 include query service 136, ranking model 138, and one or more components of position effects system 150. Query service 136 executes queries against one or more data stores. Query service 136 is used to generate result sets, e.g., sets of ranked digital content items, either in response to a user-generated query or in response to some other type of user interface event. For example, query service 136 can generate a set of digital content items to automatically populate a feed or a recommendation portion of a user interface in response to a page load at a user system.

Ranking model 138 is a machine learning model that has been trained to rank search results produced by query service 136. In some embodiments, position effects system 150 generates output that is used to train ranking model 138. Output produced by ranking model 138 is used by front-end services 132 to arrange digital content items in accordance with one or more parameters of an impression channel and/or one or more parameters of an impression portal. For example, a parameter of a job search impression channel could specify that search results are to be presented in a vertically scrollable list. As another example, a parameter of a smartphone impression portal could specify the maximum size (e.g., using x-y coordinates) of a user interface panel used to display digital content items in a result set.

A machine learning model such as ranking model 138 is, in some embodiments, a combination of data and computer code that reflects relationships between sets of inputs and the outputs produced by the application of a machine learning algorithm to those sets of inputs. After a machine learning model has been trained, these relationships between inputs and outputs are reflected in the values of the machine learning algorithm parameters and/or coefficients. For example, application of a machine learning algorithm to training data adjusts the values of machine learning model parameters and/or coefficients iteratively until parameter and/or coefficient values are found that produce statistically reliable output, e.g., predictions, classifications, inferences, or scores. A loss function is used to compute model error (e.g., a comparison of model-generated values to validated or ground-truth values) at an iteration, in order to determine whether the model is producing reliable output or whether to adjust any parameter values and/or coefficient values.

Machine learning algorithm can refer to a single algorithm applied to a single set of inputs, multiple iterations of the same algorithm on different inputs, or a combination of different algorithms applied to different inputs. For example, in a neural network, a node corresponds to an algorithm that is executed on one or more inputs to the node to produce one or more outputs. A group of nodes each executing the same algorithm on a different input of the same set of inputs can be referred to as a layer of a neural network. The outputs of a neural network layer or a portion of a layer can constitute the inputs to another layer or portion of a layer of the neural network. A neural network can include an input layer that receives and operates on one or more raw inputs and passes output to one or more hidden layers, and an output layer that receives and operates on outputs produced by the one or more hidden layers to produce a final output.

The selection of machine learning algorithm, loss function, and associated parameter and/or coefficient values can be dependent on the requirements of the particular application system; e.g., the type of output desired to be produced and the nature of the inputs. For purposes of this disclosure, position effects system 150 is agnostic as to the type and configuration of any particular ranking model 138. Ranking model 138 is hosted by a server computer or network of servers, in some embodiments. Portions of ranking model 138 are implemented on a client device, e.g., a user system 110, in some embodiments.

Figure 2:
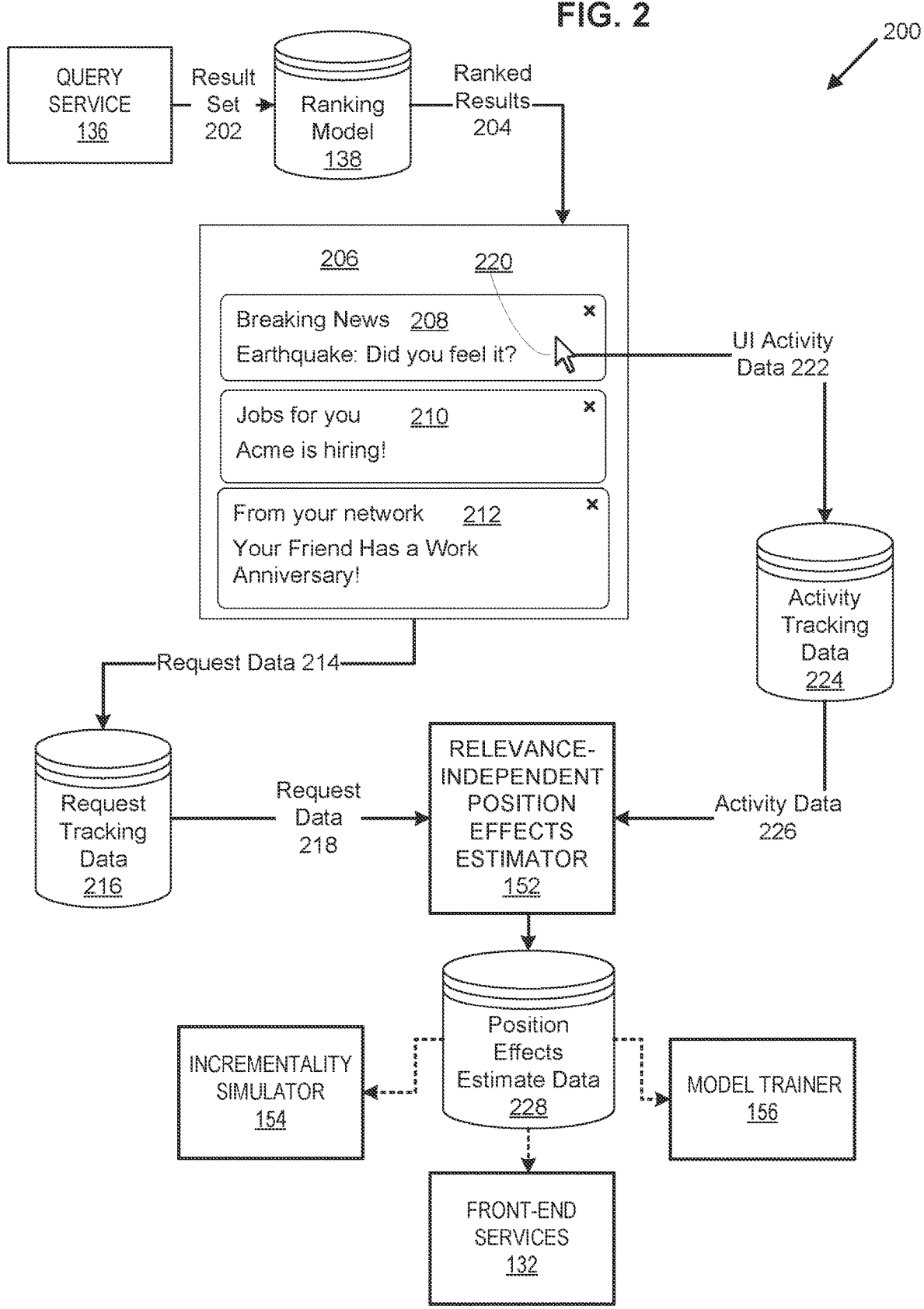
FIG. 2 is a flow diagram for position effects estimation in accordance with some embodiments of the present disclosure.

FIG. 2 is a flow diagram for relevance-independent position effects estimation in accordance with some embodiments of the present disclosure. The method 200 is performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, portions of the method 200 are performed by the application system 130 and/or the position effects system 150 of FIG. 1A. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

In the example of FIG. 2, query service 136 executes a query and generates a result set 202. For example, query services obtains search terms from, e.g., front-end service 132, where the search terms are user-generated and/or system-generated, formulates a computer-readable search query based on the search terms, executes the query on a corpus of digital content items, retrieves digital content items that match the query from the corpus, and determines result set 202 based on the retrieved digital content items. Result set 202 includes, for example, a content item identifier and a reference or link, such as a URL (Uniform Resource Locator) for each retrieved digital content item.

A trained ranking model 138 is applied to result set 202 and produces ranked results 204. For example, ranking model 138 is trained to assign a ranking score to each digital content item based on the relevance of the digital content item to the query. Ranking model 138 takes multiple different types of inputs, such as priority, and relevance inputs, in some embodiments. Ranked results 204 include, for each item in result set 202, a ranking score and position. Thus, an item of ranked results 204 includes, for example, the content item identifier and the associated ranking score and position.

Ranked results 208, 210, 212 are sorted and displayed on user interface 206 in rank order according to position. For example, if position 1 corresponds to the highest ranking score, ranked results 204 are arranged in ascending order of position. Conversely, if position 1 corresponds to the lowest ranking score, ranked results 204 are arranged in descending order of position. In either case, the position value that corresponds to the highest relevance is assigned to the highest-visibility area of the user interface that is available to display ranked results 204 while other position values are assigned to lower-visibility areas of the user interface.

User interface 206 illustrates three ranked results 208, 210, 212. Thus, in user interface 206, ranked results 208, 210, 212 are digital content items that are listed in descending order of relevance as determined based on the ranking score. Result 208 has a higher relevance than result 210, and result 210 has a higher relevance than result 212. The use of three results is for ease of discussion only. Embodiments are not limited to result sets of size three or to the display of only three results at a time. The number of items in result set 202, ranked results 204, and displayed on a user interface vary and are determined by the requirements of a particular design or implementation.

When a user system issues a request, i.e., loads a page that contains user interface 206, including ranked results 204, real-time tracking system 160 captures request data 214 associated with the page load and stores request data 214 as request tracking data 216. Request tracking data 216 is stored in, for example, a searchable log file, a key-value store, a database, or other form of data store. For example, request tracking data 216 includes one row of data per request, for all requests of all users of application system 130. The amount of request tracking data retained by request tracking data 216 can be constrained by, for example, a time interval. For example, the data stored in request tracking data 216 can be refreshed periodically, such as once a week or once a day.

After user interface 206 is loaded, i.e., rendered, on a user system, a user viewing user interface 206 initiates a user interface event 220 by, for example, selecting digital content item 208 with an input device. When a user system initiates a user interface event (e.g., click), real-time tracking system 160 captures user interface (UI) activity data 222 associated with the user interface event and stores UI activity data 222 as activity tracking data 224. Activity tracking data 224 is stored in, for example, a searchable log file, database, or other form of data store. For example, activity tracking data 224 includes one row of data per user interface event, for all user interface events of all users of application system 130. The amount of UI activity tracking data 222 retained by activity tracking data 224 can be constrained by, for example, a time interval. For example, the data stored in activity tracking data 224 can be refreshed periodically, such as once a week or once a day.

Relevance-independent position effects estimator 152 ("estimator 152") generates position effects estimates, for example periodically as an offline or nearline process. To generate position effects estimates, estimator 152 obtains request data 218 from request tracking data 216 and obtains activity data 226 from activity tracking data 224, e.g., by querying those data stores.

For example, request data 218 is stored in a table having a schema in which request identifier is the key and there are three columns: position, content item identifier, and ranking score. In Table 1, ranking score and position are provided as whole numbers for ease of discussion. Ranking score and position are not required to be whole numbers but rather can be indicated in any number of other ways, such as by real numbers or percentages.

TABLE 1

Example of Request Data.
Request ID: R001

| Position | Content Item ID | Ranking Score |
|---|---|---|
| 1 | C235 | 100 |
| 2 | C401 | 90 |
| 3 | C297 | 89 |

Separately, activity data 226 is stored in a table having a schema in which request identifier is the key and there are two columns: content item identifier and activity data. In Table 2, activity data is a binary variable in which a value of 1 indicates a click and a value of 0 corresponds to no click. Activity data is not required to be binary but rather can be indicated in any number of ways. In addition, activity data can be tracked with additional granularity; for example, different types of user interface events can be tracked separately (e.g., view vs. share vs. comment).

TABLE 2

Example of Activity Data.
Request ID: R001

| Content Item ID | Activity Data |
| --- | --- |
| C235 | 1 |
| C401 | 1 |
| C297 | 0 |

Estimator 152 joins the request data 218 with the activity data 226 for each request using the request identifier as key to produce a set of joined data records having a schema in which each row of the set of data records includes, for a given request identifier, both request data 218 and activity data 226 associated with that request identifier.

TABLE 3

Example of Joined Data.
Request ID: R001

| Position | Content Item ID | Ranking Score | Activity Data |
| --- | --- | --- | --- |
| 1 | C235 | 100 | 1 |
| 2 | C401 | 90 | 1 |
| 3 | C297 | 89 | 0 |

Estimator 152 conducts a per-request evaluation of the joined data records. During the per-request evaluation, estimator 152 sorts the rows of the joined table by position so that the highest position (corresponding to the highest relevance) is the first row and the sorted rows are arranged in order of decreasing position. Estimator 152 conducts a pairwise comparison of the sorted rows in which it generates a score difference for each pair of adjacent rows.

TABLE 4

Example of Joined Data After Pairwise Comparison.
Request ID: R001

| Position | Content Item ID | Ranking Score | Activity Data | Score Difference |
| --- | --- | --- | --- | --- |
| 1 | C235 | 100 | 1 | 0 |
| 2 | C401 | 90 | 1 | 10 |
| 3 | C297 | 89 | 0 | 1 |

In the per-request evaluation, estimator 152 selects row pairs for which the score difference is very small or infinitesimal, e.g., there is negligible difference in the ranking scores for the two content items in the pair. For example, estimator 152 compares the score difference for each row pair to a threshold value and if the score difference is below, or at or below, the threshold value, estimator 152 selects the row pair for downstream computations.

In the example of Table 4, the score difference for the position 2/position 3 row pair is 1. If the score difference threshold value is 1, estimator 152 selects the position 2/position 3 row pair for downstream computations. In Table 4, the score difference and threshold score difference value are provided as whole numbers for ease of discussion. The score difference and threshold score difference value are not required to be whole numbers but rather can be indicated in any number of ways. For instance, the score difference and threshold score difference value can be indicated as real numbers, where the threshold score difference value is a real number that is very close to zero (e.g., in the range of about 0.002). Alternatively, the score difference and threshold score difference threshold value can be represented as percentages.

Irrespective of how estimator 152 computes the pairwise score difference values, estimator 152 selects row pairs from the request in which a very small change in the ranking score would result in a change in position on the user interface. For example, in Table 4, increasing the ranking score of content item C297 by only one point would cause content item C297 to be assigned to position 2 instead of position 3. Likewise, decreasing the ranking score of content item C401 by one point would cause content item C401 to be assigned to position 3 instead of position 2. By only selecting adjacent row pairs that have very low score differences and using only those selected row pairs for downstream computations, estimator 152 neutralizes or removes the effect of the ranking score (and thus, relevance) on the position effects estimates.

Estimator 152 repeats the process of selecting adjacent row pairs with low score differences for each request ID of a given set of request IDs. The size of the set of request IDs is determined by a filter criterion, such as a time interval and/or a computing environment parameter. For example, estimator 152 generates position effects estimates based on requests that occurred within a particular time interval and/or on a particular impression portal or in a particular impression channel. Estimator 152 aggregates all of the selected low score difference row pairs across all of the requests in the set of requests.

TABLE 5

Example of Aggregate Data.

| Request ID | Position | Content Item ID | Ranking Score | Activity Data | Score Difference |
| --- | --- | --- | --- | --- | --- |
| R001 | 2 | C401 | 90 | 1 | 1 |
| R001 | 3 | C297 | 89 | 0 | −1 |
| R002 | 3 | C899 | 99 | 1 | 3 |
| R002 | 4 | C721 | 97 | 0 | −3 |

In some implementations, estimator 152 performs the above-described operations and aggregates the low score difference row pairs across a very large number of requests, e.g., millions of requests or more. Estimator 152 computes average click probabilities for each position based on this aggregate data.

TABLE 6

Example of Click Probability Data.
Filter Criterion = Time
Interval and/or Computing
Environment Parameter

| Position | Average Click Probability |
| --- | --- |
| 2 | 0.4 |
| 3 | 0.3 |
| 4 | 0.1 |

As shown in Table 6, estimator 152 generates click probabilities for different filter criteria. For example, estimator 152 can separately generate click probability data for different time intervals, impression portals, and/or impression channels.

Estimator 152 computes position effects estimates using the click probability data that has been computed based on only the low score difference adjacent row pairs. As a result, the position effects estimates produced by estimator 152 are not biased by relevance or ranking score. To compute the position effects estimates, estimator 152 uses a regression discontinuity design (RDD)-based approach. For example, estimator 152 takes the ratio of the average click probabilities at each position. For instance, using Table 6 as an example, position 2/position 3=an estimated position effect of 0.4/0.3 or 1.33.

More generally, the RDD approach is applied to the problem of de-biasing position effects by making the difference in ranking scores between items in two adjacent positions the running variable (X variable). The running variable produces discontinuous changes in positions when the 0-threshold is crossed: if for a particular item the difference in ranking scores to the adjacent item is negative, the particular item is ranked in the lower position and the adjacent item in the next higher position. If the difference in ranking scores is positive, the positions flip and the particular item is ranked in the higher position and the adjacent item in the next lower position. The difference in click probabilities (Y variable) between items with a slightly positive score difference and items with a slightly negative score difference serves as the unbiased position effect estimate. Estimator 152 generates plots that illustrate position effects estimates. FIG. 3B and FIG. 3C, described below, are examples of plots that can be generated by estimator 152. FIG. 3B and FIG. 3C illustrate discontinuous changes in position, which are produced by very small changes in the running variable at the 0-threshold. These changes lead to discontinuous change in the click probability (Y variable) at the 0-threshold corresponding to the position effect.

The position effects estimate data produced by estimator 152, which in some cases include plots, is stored as position effects estimate data 228. Position effects estimate data 228 is stored in a searchable data store, such as a database, such that position effects estimate data 228 is available for use by one or more downstream systems or services. Position effects estimate data 228 is optionally retrieved and used by one or more of front-end services 132, incrementality simulator 154, and model trainer 156. For example, plots produced by estimator 152 are sent to front-end services 132 for presentation on a user interface of a user system.

As another example, position effects data produced by estimator 152 is used by incrementality simulator 154 to generate incrementality simulations for various computing environment scenarios. Additional aspects of incrementality simulator 154 are described below with reference to FIG. 4. As yet another example, position effects data produced by estimator 152 is used by model trainer 156 to train or retrain a ranking model. Additional aspects of model trainer 156 are described below with reference to FIG. 5.

Figure 3A:
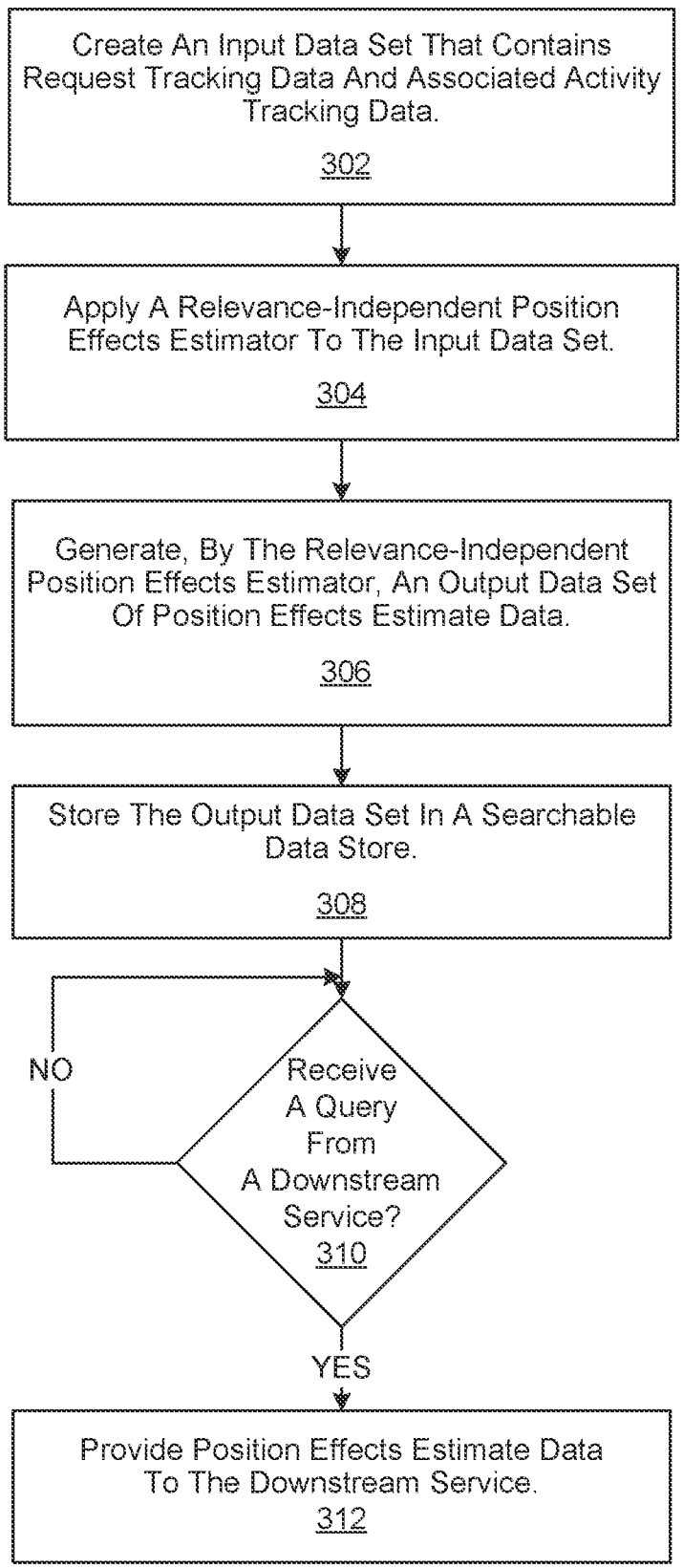
FIG. 3A is a flow diagram of an example method to provide relevance-independent position effect estimates to a downstream service in accordance with some embodiments of the present disclosure.
Figure 3B:
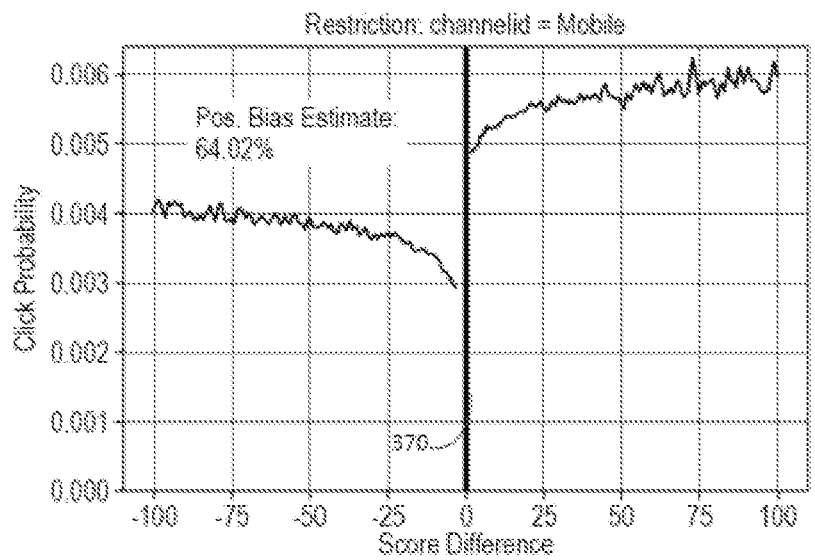
FIG. 3B and FIG. 3C are examples of plots of position effects estimate data in accordance with some embodiments of the present disclosure.
Figure 3C:
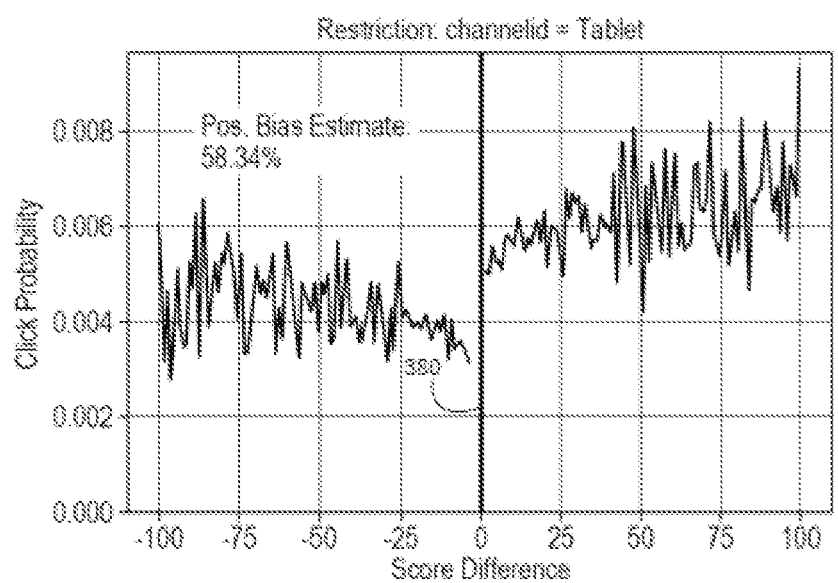

FIG. 3A is a flow diagram of an example method to provide relevance-independent position effect estimates to a downstream service in accordance with some embodiments of the present disclosure. The method 300 is performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, portions of the method 300 are performed by the application system 130 and/or the position effects system 150 of FIG. 1.

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 302, the processing device creates an input data set that contains request tracking data and associated activity tracking data for each request (e.g., page load) of a set of requests. The request tracking data and associated activity tracking data include historical ranking scores and click data that has been collected, for example, by real-time tracking system 160.

For each request, a set of digital items are presented in different positions on a user interface. The request tracking data for a given request includes, for each request, a request identifier, a set of content identifiers, position data for the content item associated with each content identifier, and a ranking score associated with each content item. The request data also includes, in some embodiments, an impression channel identifier and/or an impression portal identifier associated with the given request.

The request identifier is data that identifies the specific page load. The content identifier is data that identifies a specific digital item of the set of digital items that are presented in the request. A single request has multiple different content identifiers when the request is to present a ranked set of digital items. Each content item identifier has an associated ranking score and position.

Still at operation 302, the activity tracking data for a given request includes, for each content item presented in the request, the request identifier, the content identifier, and activity data. The activity data indicates, for the associated content item, whether a user interface event occurred that indicates user activity (e.g., whether or not there was a click on the content item).

Also at operation 302, the processing device joins the request data and the associated activity data using the request identifier and the content item identifier.

At operation 304, the processing device applies a relevance-independent position effects estimator to the input data set produced by the processing device in operation 302. For each request, the processing device calculates score differences between adjacently positioned content items of a ranked list of content items (i.e., the list of content items is sorted in order of decreasing ranking score and then the score differences are computed). To calculate the score differences, the processing device compares the ranking scores of the content items that are at adjacent positions in the request, as determined based on the position data.

Still at operation 304, the processing device identifies content items that are ranked in adjacent positions that are infinitesimally close in their ranking scores. The processing device identifies these content items based on a comparison of the calculated score differences between adjacent items to a threshold score difference value. The threshold score difference value is very close to zero, which is the cutoff value for changing position. The two content items in the pair of adjacent content items having a very small score difference value switch position at the cutoff value of 0. However, the change in position is not confounded by differences in relevance because the change in relevance is very small, e.g., infinitesimal (where the difference in relevance is controlled by the score difference threshold value).

Also at operation 304, the processing device aggregates the identified pairs of adjacent content items having very small score differences across all requests in the set of requests. Using the aggregated data, the processing device generates a probability distribution over the aggregated activity data (e.g., click data) for each position and/or score difference. In some embodiments, the processing device performs the aggregation of the identified pairs of adjacent content items separately for different computing environment parameter values. For example, the aggregation is performed separately for different impression channels and/or for different impression portals, to enable segmented estimates of position effects for different combinations of computing environment parameter values.

At operation 306, the processing device generates, by the relevance-independent position effects estimator, an output data set of position effects estimate data. The output data set includes, for example, position effects estimates for different impression portals or for different impression channels. The quantitative interpretation of the estimated position effect is in terms of the percentage increase in the click probability resulting from a change in position, holding the ranking score constant. For example, position effect for a content item moving from a position y to a position x is defined as: click Probability(position x, score)=position effect multiplied by click Probability(position y, score).

Because the relevance score difference between adjacent content items is very small (when below the score difference threshold value), the percentage increase in click probability resulting from the change in position is much greater than the percentage increase in click probability due to the change in relevance score. For example, two items with relevance score difference that is below the score difference threshold value and that have the same position would have a small difference in click probability, such as 0.1%. (Note that such example cannot be directly observed in a single output, since only one item occupies any given position.) In contrast, two items with the same difference in relevance score as before but that have different positions have a large difference in click probability, such as 20%.

Output generated by the processing device at operation 306 includes, for example, a table of position effects data and/or one or more plots illustrating position effects computed for one or more subsets of the input data set. An example of an output data set including a table schema is shown in Table 7.

TABLE 7

Example of Output Data Set.
Position Effect Decay Curve (Normalized to 1 for position 1)

| Position | Impression Channel | Impression Portal | Position Effect |
|---|---|---|---|
| 1 | Job recommendation | Desktop | 1 |
| 2 | Job recommendation | Desktop | 0.7 |
| 3 | Job recommendation | Desktop | 0.5 |
| 1 | Similar Jobs | Mobile | 1 |

At operation 308, the processing device stores the output data set in a searchable data store, such as a database. At operation 310, the processing device waits for a query that contains a request for position effects data from a downstream service. If the processing device receives a query from a downstream service that requests position effects estimate data, the processing device proceeds to operation 312. If the processing device does not receive a query from a downstream service that requests position effects estimate data, the processing device remains at operation 310 or returns to operation 302 to generate another output data set.

At operation 312, the processing device provides position effects estimate data to the requesting downstream service. For example, the processing device provides position effects estimate from the searchable data store to incrementality simulator 154, model trainer 156, or front-end services 132.

FIG. 3B and FIG. 3C are examples of plots of position effects estimates in accordance with some embodiments of the present disclosure. The estimated click position effect is visualized in FIG. 3B and FIG. 3C. FIG. 3B and FIG. 3C show position effect plots for different portals (mobile devices, and tablet computers, respectively). In both plots, the y-axis shows the click probability and the x-axis shows the difference in the ranking score of pairs of adjacent content items. Portions of the plot to the right of the cutoff value (here, the cutoff value is zero as illustrated by lines 370, 380) are observations in which the x-value shows the difference in the ranking score between a result with a higher ranking score and the result with the next highest ranking score (i.e., the score difference is positive). Portions of the plot to the left of the cutoff value are observations in which the x value shows the difference in the ranking score between a lower-ranked result and the adjacent result with a higher ranking score (i.e., the score difference is negative).

In FIG. 3B, the position effect corresponds to the increase in click probability from the first portion of the plot immediately to the left of the cutoff line 370 to the second portion of the plot immediately to the right of the cutoff line 370. In FIG. 3C, the position effect corresponds to the increase in click probability from the first portion of the plot immediately to the left of the cutoff line 380 to the second portion of the plot immediately to the right of the cutoff line 380. In the data that produced FIG. 3B and FIG. 3C, the position effect is different (higher) for presentations of the ranked content items on the mobile device than for presentations on the tablet computer.

Figure 4:
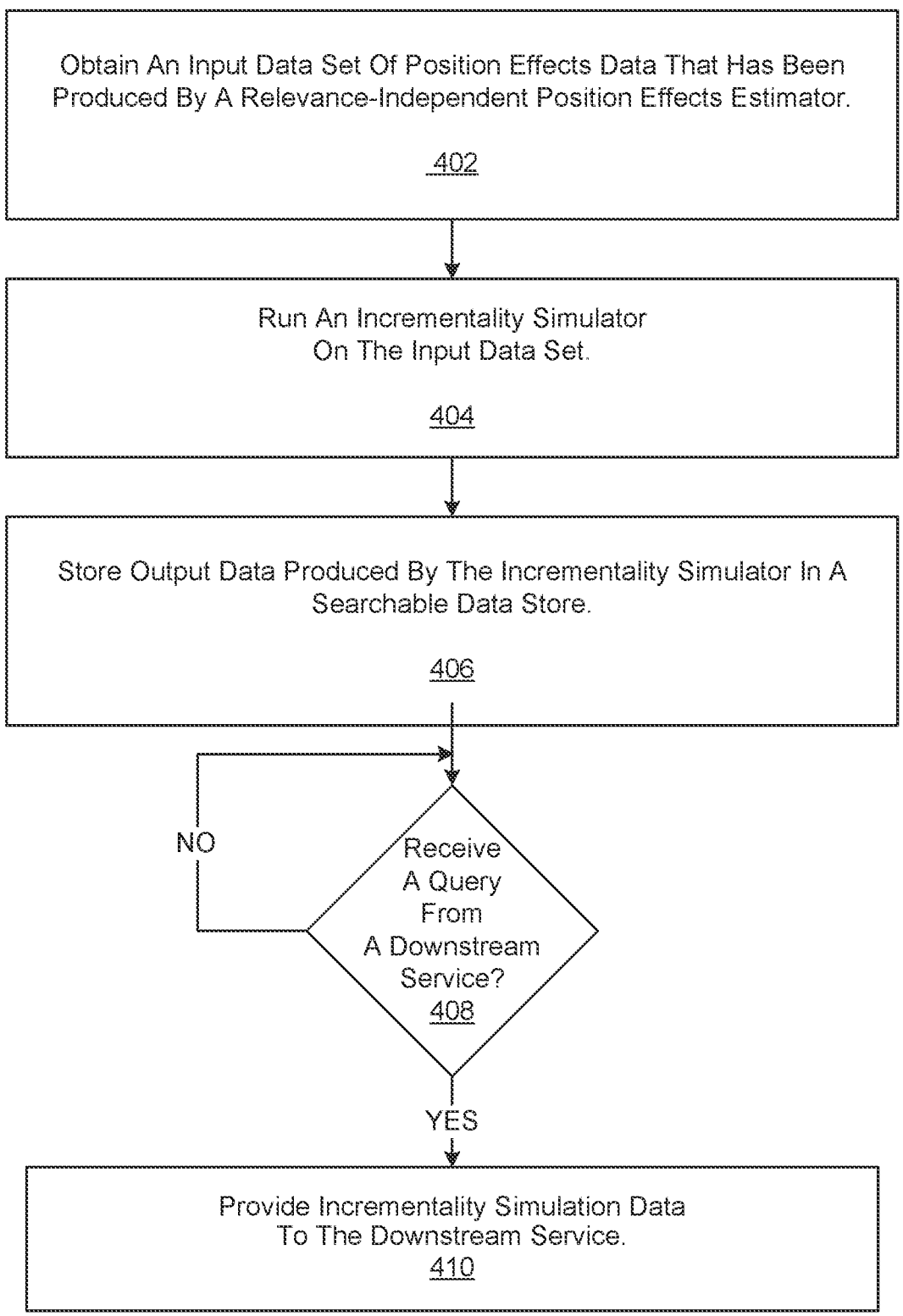
FIG. 4 is a flow diagram of an example method to run an incrementality simulator in accordance with some embodiments of the present disclosure.

FIG. 4 is a flow diagram of an example method to run an incrementality simulator in accordance with some embodiments of the present disclosure.

The method 400 is performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the position effects system 150 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 402, the processing device obtains an input data set of position effects data that has been produced by a relevance-independent position effects estimator. For example, operation 402 retrieves data from the output data set produced by operation 306 of method 300, described above, to create the input data set.

At operation 404, the processing device runs an incrementality simulator on the input data set to simulate the performance of a ranking model under various different computing environment conditions (such as changes in priority values, changes in ranking scores, and/or changes in one or more computing environment parameters). Incrementality as used herein refers to the net change in outcomes (e.g., click probability) per unit increase in priority.

Incrementality is inherently hard to quantify because it is a marginal statistic that cannot be directly inferred from data but rather needs to be estimated. Using the disclosed approaches, the incrementality simulator quantifies incrementality forecasts at a high level of resolution, if needed, which other approaches are unable to do. For example, the incrementality simulator continuously measures, monitors, and updates its click probability forecast as the priority value changes. The incrementality simulator can be used to monitor incrementality over time such that changes in the data used to produce the simulation are reflected in changes to incrementality and reflected in the output of the simulator. In some embodiments, the incrementality simulator generates training data for a forecasting model that generates forecasts of changes in outcomes (e.g. clicks) responsive to anticipated changes in the data used to run the simulation (for example, changes in priority).

When the incrementality simulator is run on the input data set, the incrementality simulator generates output data. The output data includes a simulated outcome. The simulated outcome includes a mapping of priority value to forecasted outcome (e.g., click probability) at that priority value. In contrast to other approaches, the output data produced by the disclosed incrementality simulator is more accurate because it is based on relevance-independent position effects estimates.

At operation 406, the processing device stores output data produced by the incrementality simulator at operation 404 in a searchable data store, such as a database. At operation 408, the processing device waits for a query that contains a request for incrementality simulation data from a downstream service. If the processing device receives a query from a downstream service that requests incrementality simulation data, the processing device proceeds to operation 410. If the processing device does not receive a query from a downstream service that requests incrementality simulation data, the processing device remains at operation 408 or returns to operation 402 to generate another output data set. At operation 410, the processing device provides incrementality simulation data to the requesting downstream service. For example, the processing device provides incrementality simulation data from the searchable data store to a forecasting model for training, in response to a request for the simulation data from the forecasting model. The forecasting model could then be requested by one or more front-end services 132.

Figure 5:
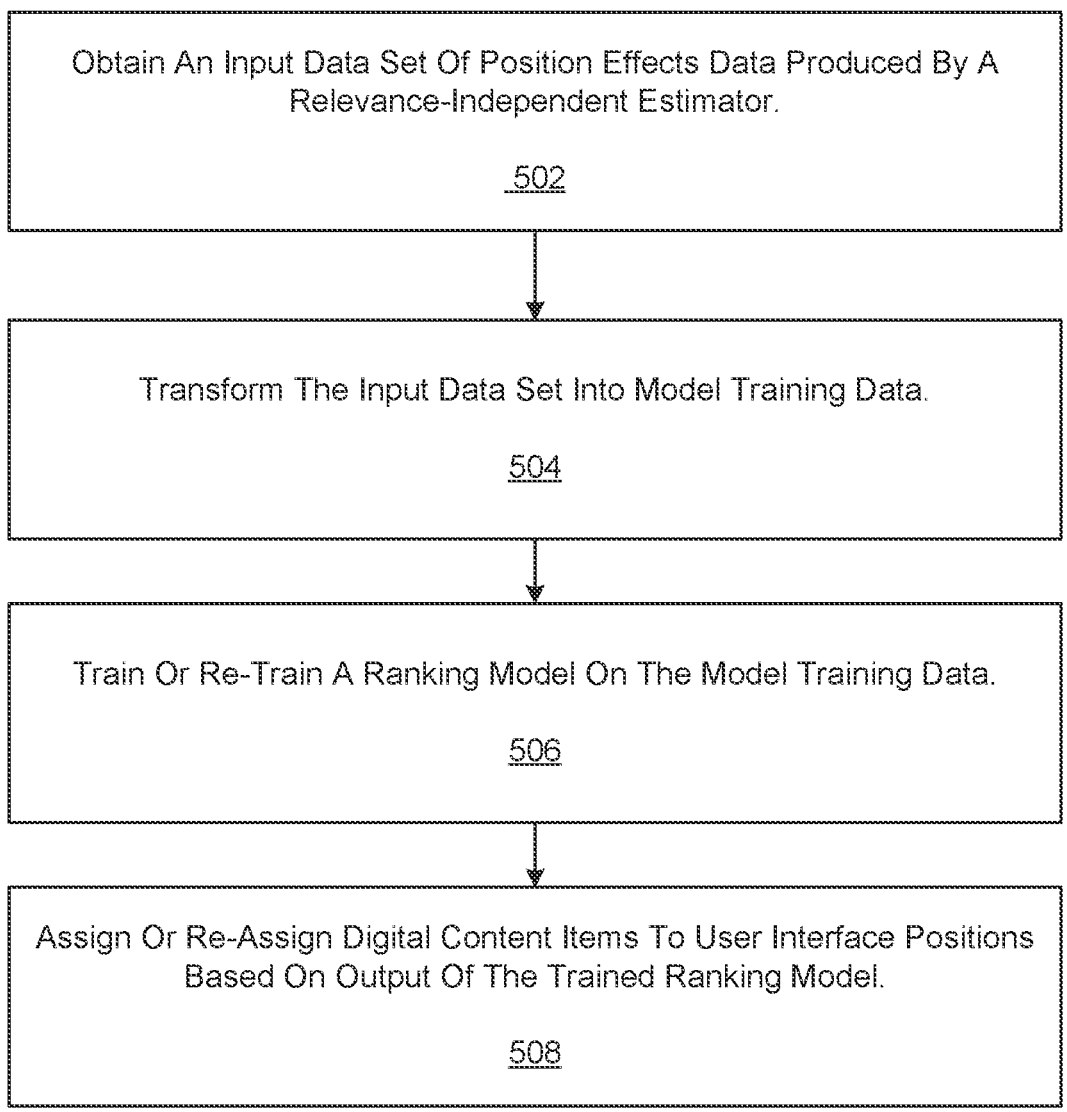
FIG. 5 is a flow diagram of an example method to train a ranking model in accordance with some embodiments of the present disclosure.

FIG. 5 is a flow diagram of an example method to train a ranking model in accordance with some embodiments of the present disclosure.

The method 500 is performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, portions of the method 500 are performed by the application system 130 and/or the position effects system 150 of FIG. 1.

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 502, the processing device obtains an input data set of position effects data produced by a relevance-independent estimator. For example, operation 502 retrieves data from the output data set produced by operation 306 of method 300, described above, to create the input data set.

At operation 504, the processing device transforms the input data set into model training data. For example, the processing device uses the position effects data obtained at operation 502 to compute inverse propensity weights and calculate a weighted loss function for the ranking model. The resulting model training data is de-biased from position effects. The model training data also includes other training features, in some embodiments.

At operation 506, the processing device trains or re-trains a ranking model on the model training data produced at operation 504. After the training or re-training of operation 506, the trained or re-trained ranking model produces ranking scores that are based at least partly on the position effects data obtained at operation 502. At operation 508, the processing device assigns digital content items of a set of digital content items to user interface positions based on ranking scores output by the trained or re-trained ranking model. In doing so, one or more of the digital content items are re-assigned to different user interface positions based at least partly on the position effects data used to train or re-train the ranking model. The set of content items, including position assignments or position re-assignments produced by the trained or re-trained ranking model, are provided to one or more downstream systems, such as a front-end service 132.

FIG. 6 illustrates an example machine of a computer system 600 within which a set of instructions for causing the machine to perform any one or more of the methodologies discussed herein are executed. In some embodiments, the computer system 600 corresponds to a component of a networked computer system (e.g., the computer system 100 of FIG. 1) that includes, is coupled to, or utilizes a machine to execute an operating system to perform operations corresponding to the position effects system 150 of FIG. 1.

The machine is connected (e.g., networked) to other machines in a local area network (LAN), an intranet, an extranet, and/or the Internet, in some embodiments. The machine operates in the capacity of a server or a client machine in a client-server network environment, as a peer machine in a peer-to-peer (or distributed) network environment, or as a server or a client machine in a cloud computing infrastructure or environment, in various embodiments.

The machine is a personal computer (PC), a smart phone, a tablet PC, a set-top box (STB), a Personal Digital Assistant (PDA), a cellular telephone, a web appliance, a server, or any machine capable of executing a set of instructions (sequential or otherwise) that specify actions to be taken by that machine. Further, while a single machine is illustrated, the term "machine" includes any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random-access memory (DRAM) such as synchronous DRAM (SDRAM) or Rambus DRAM (RDRAM), etc.), a memory 606 (e.g., flash memory, static random-access memory (SRAM), etc.), an input/output system 610, and a data storage system 640, which communicate with each other via a bus 630.

The main memory 604 is configured to store instructions 614 for performing the operations and steps discussed herein. Instructions 614 include portions of position effects system 150 when those portions of position effects system 150 are stored in main memory 604. Thus, position effects system 150 is shown in dashed lines as part of instructions 614 to illustrate that portions of position effects system 150 can be stored in main memory 604. However, it is not required that position effects system 150 be embodied entirely in instructions 614 at any given time and portions of position effects system 150 can be stored in other components of computer system 600.

Processing device 602 represents one or more general-purpose processing devices such as a microprocessor, a central processing unit, or the like. Processing device 602 is a complex instruction set computing (CISC) microprocessor, reduced instruction set computing (RISC) microprocessor, very long instruction word (VLIW) microprocessor, or a processor implementing other instruction sets, or processors implementing a combination of instruction sets, in some embodiments. Alternatively, processing device 602 is one or more special-purpose processing devices such as an application specific integrated circuit (ASIC), a field programmable gate array (FPGA), a digital signal processor (DSP), network processor, or the like. The processing device 602 is configured to execute instructions 612 for performing the operations and steps discussed herein.

Instructions 612 include portions of position effects system 150 when those portions of position effects system 150 are being executed by processing device 602. Thus, similar to the description above, position effects system 150 is shown in dashed lines as part of instructions 612 to illustrate that, at times, portions of position effects system 150 are executed by processing device 602. For example, when at least some portion of position effects system 150 is embodied in instructions to cause processing device 602 to perform the method(s) described above, some of those instructions can be read into processing device 602 (e.g., into an internal cache or other memory) from main memory 604 and/or data storage system 640. However, it is not required that all of position effects system 150 be included in instructions 612 at the same time and portions of position effects system 150 are stored in one or more other components of computer system 600 at other times, e.g., when one or more portions of position effects system 150 are not being executed by processing device 602.

The computer system 600 can further include a network interface device 608 to communicate over the network 620. Network interface device 608 can provide a two-way data communication coupling to a network. For example, network interface device 608 can be an integrated-services digital network (ISDN) card, cable modem, satellite modem, or a modem to provide a data communication connection to a corresponding type of telephone line. As another example, network interface device 608 can be a local area network (LAN) card to provide a data communication connection to a compatible LAN. Wireless links can also be implemented. In any such implementation network interface device 608 can send and receives electrical, electromagnetic, or optical signals that carry digital data streams representing various types of information.

The network link can provide data communication through at least one network to other data devices. For example, a network link can provide a connection to the world-wide packet data communication network commonly referred to as the "Internet," for example through a local network to a host computer or to data equipment operated by an Internet Service Provider (ISP). Local networks and the Internet use electrical, electromagnetic, or optical signals that carry digital data to and from computer system computer system 600.

Computer system 600 can send messages and receive data, including program code, through the network(s) and network interface device 608. In the Internet example, a server can transmit a requested code for an application program through the Internet 628 and network interface device 608. The received code can be executed by processing device 602 as it is received, and/or stored in data storage system 640, or other non-volatile storage for later execution.

The input/output system 610 can include an output device, such as a display, for example a liquid crystal display (LCD) or a touchscreen display, for displaying information to a computer user, or a speaker, a haptic device, or another form of output device. The input/output system 610 can include an input device, for example, alphanumeric keys and other keys configured for communicating information and command selections to processing device 602. An input device can, alternatively or in addition, include a cursor control, such as a mouse, a trackball, or cursor direction keys for communicating direction information and command selections to processing device 602 and for controlling cursor movement on a display. An input device can, alternatively or in addition, include a microphone, a sensor, or an array of sensors, for communicating sensed information to processing device 602. Sensed information can include voice commands, audio signals, geographic location information, and/or digital imagery, for example.

The data storage system 640 can include a machine-readable storage medium 642 (also known as a computer-readable medium) on which is stored one or more sets of instructions 644 or software embodying any one or more of the methodologies or functions described herein. The instructions 644 can also reside, completely or at least partially, within the main memory 604 and/or within the processing device 602 at different times during execution thereof by the computer system 600, the main memory 604 and the processing device 602 also constituting machine-readable storage media.

In one embodiment, the instructions 644 include instructions to implement functionality corresponding to a feature generation component (e.g., the position effects system 150 of FIG. 1). Position effects system 150 is shown in dashed lines as part of instructions 644 to illustrate that, similar to the description above, portions of position effects system 150 can be stored in data storage system 640 alternatively or in addition to being stored within other components of computer system 600.

Dashed lines are used in FIG. 6 to indicate that it is not required that position effects system 150 be embodied entirely in instructions 612, 614, and 644 at the same time. In one example, portions of position effects system 150 are embodied in instructions 644, which are read into main memory 604 as instructions 614, and portions of instructions 614 are read into processing device 602 as instructions 612 for execution. In another example, some portions of position effects system 150 are embodied in instructions 644 while other portions are embodied in instructions 614 and still other portions are embodied in instructions 612.

While the machine-readable storage medium 642 is shown in an example embodiment to be a single medium, the term "machine-readable storage medium" should be taken to include a single medium or multiple media that store the one or more sets of instructions. The term "machine-readable storage medium" includes any medium that is capable of storing or encoding a set of instructions for execution by the machine and that cause the machine to perform any one or more of the methodologies of the present disclosure. The term "machine-readable storage medium" includes, but is not limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, which manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the computing system 100, can carry out the computer-implemented methods and processes and implement the systems described above in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, which can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

Illustrative examples of the technologies disclosed herein are provided below. An embodiment of the technologies may include any of the examples or a combination of the examples described below.

In an example 1, a method includes creating an input data set including a plurality of items of request tracking data and associated activity tracking data; an item of the input data set includes a request identifier, a content item identifier, a relevance score, user interface position data and user interface activity data; applying a relevance-independent position effects estimator to the input data set; generating, by the relevance-independent position effects estimator, an output data set; an item of the output data set includes user interface position data associated with a pair of adjacently positioned items of the input data set; the user interface position data indicates that a change in user interface activity probability data relating to a change in position between the items of the pair is greater than a change in the user interface activity probability data relating to a difference in the relevance score between the items of the pair; storing the output data set in a searchable data store; and responsive to receiving a query from a downstream service, providing data from the searchable data store to the downstream service.

An example 2 includes the subject matter of example 1, further including: training a forecasting model on a subset of the output data set and associated content item priority data; responsive to new content item priority data, by an incrementality simulator that uses the trained forecasting model, generating a mapping of the new content item priority data to user interface activity probability data; responsive to receiving a query from a second downstream service different than the downstream service, providing the mapping to the second downstream service. An example 3 includes the subject matter of example 2, further including: creating the subset of the output data set by filtering the output data set by a computing environment parameter value including at least one of an impression portal and an impression channel. An example 4 includes the subject matter of example 2, further including: continuously regenerating the mapping as values of the new content item priority data change. An example 5 includes the subject matter of any of examples 1-4, further including: generating training data based on the output data set; and training a ranking model on the training data. An example 6 includes the subject matter of any of examples 1-5, further including: by the trained ranking model, generating a ranked set of digital content items; and providing the ranked set of digital content items to a front-end service. An example 7 includes the subject matter of any of examples 1-6, further including: reassigning digital content items to new user interface positions based on the output data set. An example 8 includes the subject matter of any of examples 1-7, further including: generating a plot of relevance score differences between pairs of items of the input data set versus user interface activity probability data; and sending the plot to the downstream service. An example 9 includes the subject matter of any of examples 1-8, further including: determining the relevance score difference based on a comparison of relevance score data of pairs of adjacent items of the input data set that are associated with a same request. An example 10 includes the subject matter of example 9, further including: aggregating the items of the input data set that have a relevance score difference less than the first threshold across a plurality of different requests; and determining the user interface activity probability data by generating a probability distribution of the user interface activity data over the aggregated items of the input data set.

In an example 11, a system includes: at least one processor; memory coupled to the at least one processor; the memory stores instructions that when executed by the at least one processor cause the at least one processor to be capable of: creating an input data set including a plurality of items of request tracking data and associated activity tracking data; an item of the input data set includes a request identifier, a content item identifier, a relevance score, user interface position data and user interface activity data; applying a relevance-independent position effects estimator to the input data set; generating, by the relevance-independent position effects estimator, an output data set; an item of the output data set includes user interface position data associated with a pair of adjacently positioned items of the input data set; the user interface position data indicates that a change in user interface activity probability data relating to a change in position between the items of the pair is greater than a change in the user interface activity probability data relating to a difference in the relevance score between the items of the pair; storing the output data set in a searchable data store; and responsive to receiving a query from a downstream service, providing data from the searchable data store to the downstream service.

An example 12 includes the subject matter of example 11, where the instructions, when executed by the at least one processor, further cause the at least one processor to be capable of: training a forecasting model on a subset of the output data set and associated content item priority data; responsive to new content item priority data, by an incrementality simulator that uses the trained forecasting model, generating a mapping of the new content item priority data to user interface activity probability data; responsive to receiving a query from a second downstream service different than the downstream service, providing the mapping to the second downstream service. An example 13 includes the subject matter of example 12, where the instructions, when executed by the at least one processor, further cause the at least one processor to be capable of: creating the subset of the output data set by filtering the output data set by at least one of an impression portal type and an impression channel type. An example 14 includes the subject matter of example 12, where the instructions, when executed by the at least one processor, further cause the at least one processor to be capable of: continuously regenerating the mapping as values of the new content item priority data change. An example 15 includes the subject matter of any of examples 11-14, where the instructions, when executed by the at least one processor, further cause the at least one processor to be capable of: generating training data based on the output data set; and training a ranking model on the training data. An example 16 includes the subject matter of example 15, where the instructions, when executed by the at least one processor, further cause the at least one processor to be capable of: by the trained ranking model, generating a ranked set of digital content items; and providing the ranked set of digital content items to a front-end service. An example 17 includes the subject matter of any of examples 11-16, where the instructions, when executed by the at least one processor, further cause the at least one processor to be capable of: reassigning digital content items to user interface positions based on the output data set. An example 18 includes the subject matter of any of examples 11-17, where the instructions, when executed by the at least one processor, further cause the at least one processor to be capable of: generating a plot of relevance score differences between pairs of items of the input data set versus user interface activity probability data; and sending the plot to the downstream service. An example 19 includes the subject matter of any of examples 11-18, where the instructions, when executed by the at least one processor, further cause the at least one processor to be capable of: determining the relevance score difference based on a comparison of relevance score data of pairs of adjacent items of the input data set that are associated with a same request. An example 20 includes the subject matter of example 19, where the instructions, when executed by the at least one processor, further cause the at least one processor to be capable of: for a plurality of different requests, aggregating the items of the input data set that have a relevance score difference less than a threshold; and determining the user interface activity probability data by generating a probability distribution of the user interface activity data over the aggregated items of the input data set.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
    creating an input data set comprising a plurality of items of request tracking data and associated activity tracking data;
    an item of the input data set includes a request identifier, a content item identifier, a relevance score, user interface position data and user interface activity data;
    applying a relevance-independent position effects estimator to at least the relevance score of the input data set;
    generating, by the relevance-independent position effects estimator, an output data set;
    an item of the output data set includes user interface position data associated with a pair of adjacently positioned items of the input data set, wherein a difference between relevance scores of the adjacently positioned items in the pair is less than or equal to a threshold score difference value;
    the user interface position data indicates that a change in user interface activity probability data relating to a change in position between the items of the pair is greater than a change in the user interface activity probability data relating to a difference in the relevance score between the items of the pair;
    storing the output data set in a searchable data store; and
    responsive to receiving a query from a downstream service, providing data from the searchable data store to the downstream service.

2. The method of claim 1, further comprising:
    training a forecasting model on a subset of the output data set and associated content item priority data;
    responsive to new content item priority data, by an incrementality simulator that uses the trained forecasting model, generating a mapping of the new content item priority data to user interface activity probability data;

responsive to receiving a query from a second downstream service different than the downstream service, providing the mapping to the second downstream service.

3. The method of claim 2, further comprising:
creating the subset of the output data set by filtering the output data set by a computing environment parameter value comprising at least one of an impression portal and an impression channel.

4. The method of claim 2, further comprising:
continuously regenerating the mapping as values of the new content item priority data change.

5. The method of claim 1, further comprising:
generating training data based on the output data set; and
training a ranking model on the training data.

6. The method of claim 5, further comprising:
by the trained ranking model, generating a ranked set of digital content items; and
providing the ranked set of digital content items to a front-end service.

7. The method of claim 1, further comprising:
reassigning digital content items to new user interface positions based on the output data set.

8. The method of claim 1, further comprising:
generating a plot of relevance score differences between pairs of items of the input data set versus user interface activity probability data; and
sending the plot to the downstream service.

9. The method of claim 1, further comprising:
determining a relevance score difference based on a comparison of relevance score data of pairs of adjacent items of the input data set that are associated with a same request.

10. The method of claim 9, further comprising:
aggregating the items of the input data set that have a relevance score difference less than a threshold across a plurality of different requests; and
determining the user interface activity probability data by generating a probability distribution of the user interface activity data over the aggregated items of the input data set.

11. A system, comprising:
at least one processor;
memory coupled to the at least one processor;
the memory stores instructions that when executed by the at least one processor cause the at least one processor to be capable of:
creating an input data set comprising a plurality of items of request tracking data and associated activity tracking data;
an item of the input data set includes a request identifier, a content item identifier, a relevance score, user interface position data and user interface activity data;
applying a relevance-independent position effects estimator to at least the relevance score of the input data set;
generating, by the relevance-independent position effects estimator, an output data set;
an item of the output data set includes user interface position data associated with a pair of adjacently positioned items of the input data set, wherein a difference between relevance scores of the adjacently positioned items in the pair is less than or equal to a threshold score difference value;
the user interface position data indicates that a change in user interface activity probability data relating to a change in position between the items of the pair is greater than a change in the user interface activity probability data relating to a difference in the relevance score between the items of the pair;
storing the output data set in a searchable data store; and
responsive to receiving a query from a downstream service, providing data from the searchable data store to the downstream service.

12. The system of claim 11, wherein the instructions, when executed by the at least one processor, further cause the at least one processor to be capable of:
training a forecasting model on a subset of the output data set and associated content item priority data;
responsive to new content item priority data, by an incrementality simulator that uses the trained forecasting model, generating a mapping of the new content item priority data to user interface activity probability data;
responsive to receiving a query from a second downstream service different than the downstream service, providing the mapping to the second downstream service.

13. The system of claim 12, wherein the instructions, when executed by the at least one processor, further cause the at least one processor to be capable of:
creating the subset of the output data set by filtering the output data set by at least one of an impression portal type and an impression channel type.

14. The system of claim 12, wherein the instructions, when executed by the at least one processor, further cause the at least one processor to be capable of:
continuously regenerating the mapping as values of the new content item priority data change.

15. The system of claim 11, wherein the instructions, when executed by the at least one processor, further cause the at least one processor to be capable of:
generating training data based on the output data set; and
training a ranking model on the training data.

16. The system of claim 15, wherein the instructions, when executed by the at least one processor, further cause the at least one processor to be capable of:
by the trained ranking model, generating a ranked set of digital content items; and
providing the ranked set of digital content items to a front-end service.

17. The system of claim 11, wherein the instructions, when executed by the at least one processor, further cause the at least one processor to be capable of:
reassigning digital content items to user interface positions based on the output data set.

18. The system of claim 11, wherein the instructions, when executed by the at least one processor, further cause the at least one processor to be capable of:
generating a plot of relevance score differences between pairs of items of the input data set versus user interface activity probability data; and
sending the plot to the downstream service.

19. The system of claim 11, wherein the instructions, when executed by the at least one processor, further cause the at least one processor to be capable of:
determining a relevance score difference based on a comparison of relevance score data of pairs of adjacent items of the input data set that are associated with a same request.

20. The system of claim 19, wherein the instructions, when executed by the at least one processor, further cause the at least one processor to be capable of:

for a plurality of different requests, aggregating the items of the input data set that have a relevance score difference less than a threshold; and determining the user interface activity probability data by generating a probability distribution of the user interface activity data over the aggregated items of the input data set.

\* \* \* \* \*